June 2, 1942.  J. D'ARCEY  2,285,149
ICE-COOLING MUDDLER, METHOD OF MAKING
Filed June 13, 1940  2 Sheets—Sheet 1

Inventor:
John D'Arcey
By James R. Hodder
Attorney

June 2, 1942. J. D'ARCEY 2,285,149
ICE-COOLING MUDDLER, METHOD OF MAKING
Filed June 13, 1940 2 Sheets-Sheet 2

Inventor:
John D'Arcey
by James R. Hodder
Attorney

Patented June 2, 1942

2,285,149

UNITED STATES PATENT OFFICE 2,285,149

ICE-COOLING MUDDLER, METHOD OF MAKING

John D'Arcey, Swampscott, Mass.

Application June 13, 1940, Serial No. 340,305

1 Claim. (Cl. 62—172)

My present invention is a novel and improved ice-cooling stirring stick or muddler for use in cooling and stirring drinks contained in a glass, and includes a novel apparatus and method of forming same.

Heretofore it has been customary to use various types of stirring sticks or so-called muddlers to keep ice cubes and the contents of a glass in mixed condition either for cooling drinks or medicinal purposes.

Considerable difficulty has, of course, been found with having several ice cubes in an individual glass, or container, as they necessarily interfere with the stirring operation and are otherwise objectionable during drinking from the glass, and, furthermore, they melt quickly and dilute the contents of the glass, and cannot be readily removed without securing a spoon, which is not always available.

My invention contemplates the use of a stirring instrument with a mass of ice frozen around the outside of the stirrer or muddler, leaving a handle portion free of ice. Thus, my improved ice-coated or encircled stirring stick or muddler can be used to cool the contents of a glass, being left in the same, stirred therein, or readily removed therefrom while drinking, replaced therein for further cooling, or removed entirely to prevent the drink getting too cooled or becoming too diluted.

I have also devised a novel method of forming such an ice-coated or covered stirring device, as well as a novel and improved apparatus for carrying out the same.

Referring to the drawings illustrating a preferred embodiment of my present invention:

Figure 5:
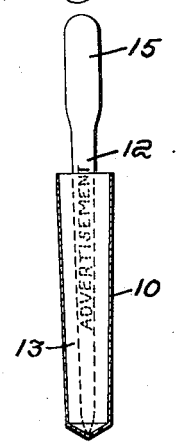
Figure 6:
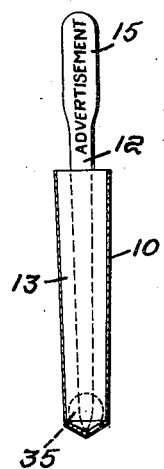
Figure 7:

Figs. 5, 6, and 7 are typical views of various modifications.

Figure 1:
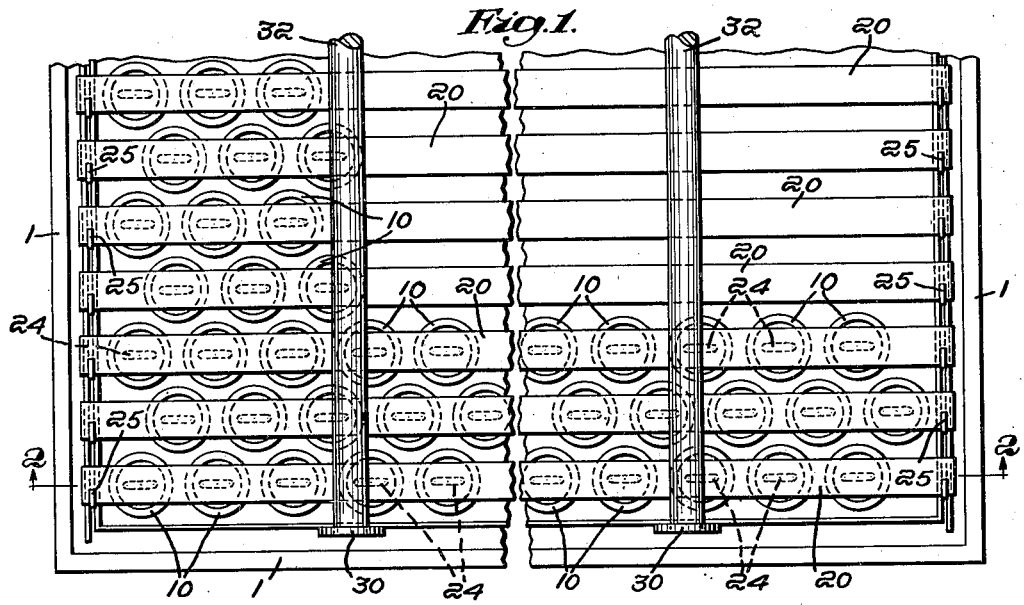
Fig. 1 is a fragmentary plan view of a novel apparatus which may be advantageously used for ice-coating stirring sticks or muddlers.

As shown in Fig. 1, my novel apparatus comprises a receptacle constituting side walls 1 and a bottom portion 2 adapted to contain a freezing liquid or refrigerant 3.

The side walls are provided with inwardly projecting lugs 5 extending around the same in suitable position near the top to receive the shouldered portion 6 of the holding apparatus adapted to fit within the receptacle 1 and of substantially the same contour but slightly less in size, the same being indicated with sides 7 and a bottom portion 8 provided with a series of depending tapered tubular members 10 of appropriate diameter to receive the stem portion 12 of a corresponding series of muddlers of suitable diameter to carry the mass of liquid 13 to be frozen around each stem portion 12 encircling the stem of the muddler.

Figure 2:
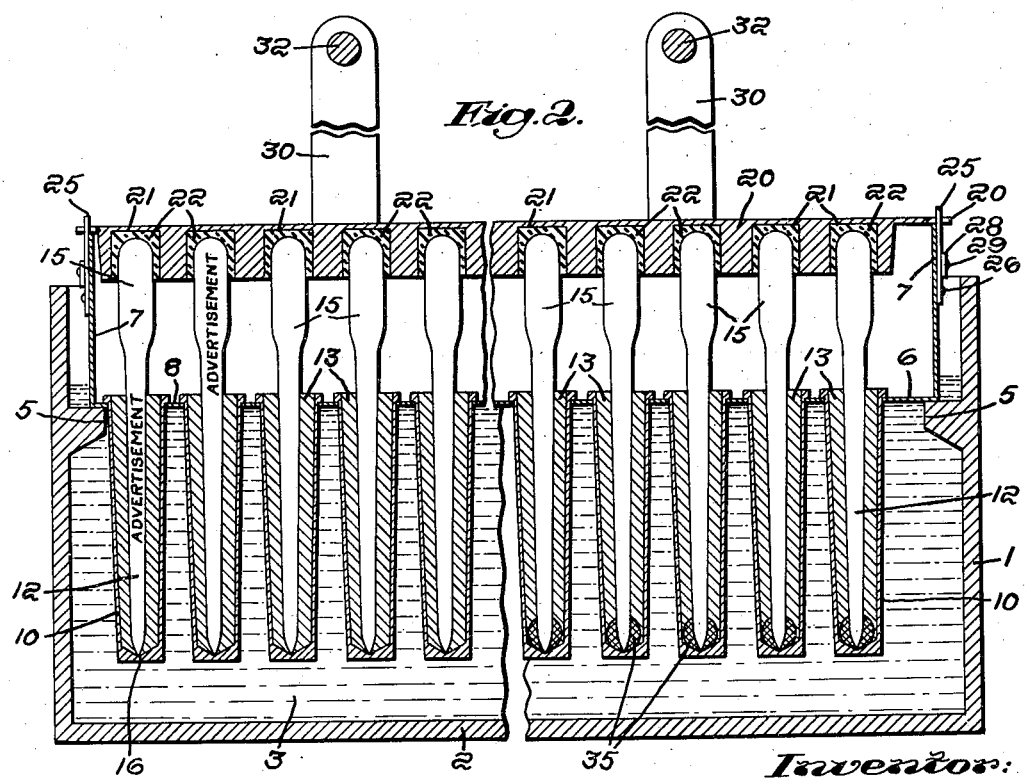
Fig. 2 is a fragmentary cross-sectional elevational view.
Figure 3:
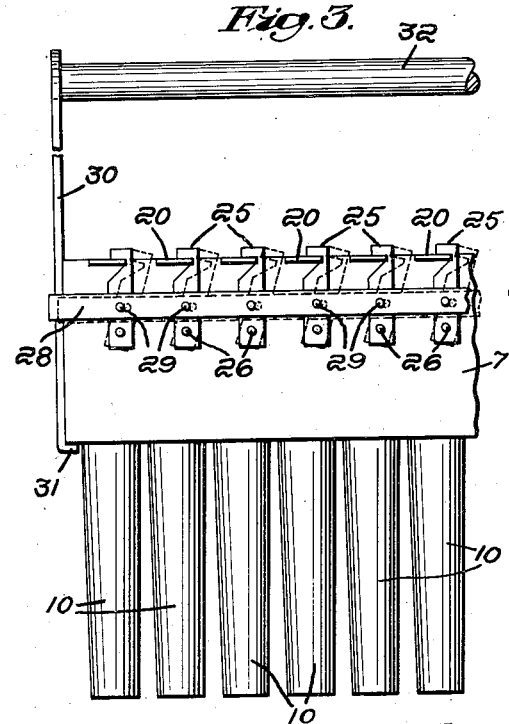
Fig. 3 is a fragmentary side view.
Figure 4:
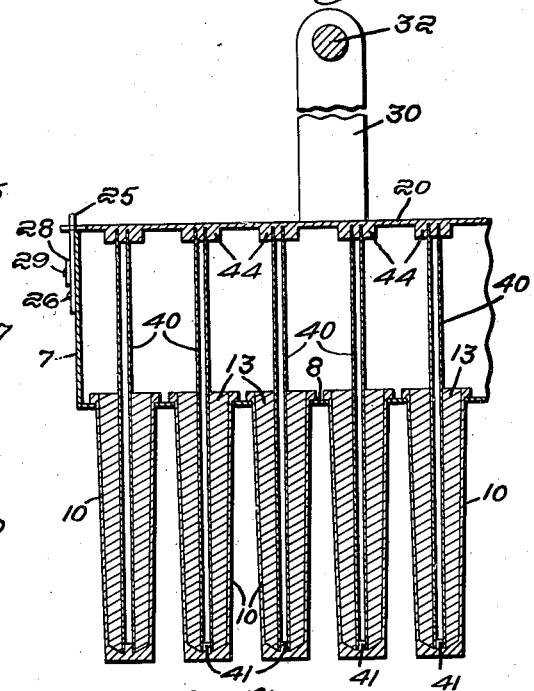
Fig. 4 is a fragmentary cross-sectional view of a modified type of muddler.

These tubular sections 10, as best shown in Figs. 2, 3, and 4, are also of appropriate diameter to contain a quantity of water 13 to be frozen to each muddler so that the same may, if desired, be substantially equal to the cooling surface afforded by two of the present standard type of ordinary ice cubes usually put in the glass. These proportions in my device can, of course, be increased or changed as desired, thus affording a larger carrying surface for longer muddlers, equal to three or four ice cubes, in the cooling effect on tall drinks, highballs, or the like.

Each muddler has its handle portion 15 extending substantially above the top of the tubular receptacle so that the handle portion will be free of encircling ice during the freezing operation.

Each bottom portion of the interior of each tubular member 10 is preferably bevelled or slanted as shown at 16, Fig. 2, to give a self-centering effect on the end of the muddler placed in the same, which end is usually pointed. To hold the top of a mass of muddlers fitted in my novel apparatus, I prove a removable top carrying a plurality of cross-members 20, having a series of recesses 21—21 therein enclosed with a lining 22 of rubber, felt, or the like to automatically compensate for any advances in the length of the individual muddlers during the clamping action, which recesses are in alignment with the tops of the tubes 10.

Preferably, also, each recess 21 is of appropriate contour to fit the top of the handle portion 15 of the muddler being utilized. Thus, for example, if the handle 15 is round, the recess 21 or the lining 22 would be accordingly so formed. Or, in the example used in the drawings for illustrative purposes, the handle 15 being long and flat, the recess 22 is accordingly so shaped, as illustrated in dotted lines, Fig. 1, at 24—24, thus also serving to center each muddler in its respective tubular member 10 between the recess in the top of the cross-bar 20 and the bevelled bottom 16 of each tube.

These cross-bars 20 may be removably attached to the sides 7 of the frame by a series of latches 25, see Fig. 3, each latch being pivotally attached at 26 to the sides 7 (see Figs. 2 and 3), and the same may be simultaneously rotated by a cross-bar 28 pinned to each latch at 29, or otherwise suitably secured for simultaneous operation of latching and unlatching the cross-bars 28.

The frame 7 with the cross-bars locked in position may be raised out of the receptacle 1 by a set of lugs 30, having catches 31, see Fig. 3, engaging underneath the shoulders 6 and lifted bodily by a pair of bales 32 after the water 13 in each of the tubes has been frozen by the refrigerant 3, and thereupon the entire mass of tubes can be quickly dipped or immersed in hot water or subjected to heat, which will loosen the water in the tubes 10 from the ice in contact therewith so that the muddlers, with their encircling ice encasing the lower stems 12 of each, can be lifted from the tubes when the top-holding frames 28 are removed, as will be readily appreciated.

As shown at the right of Fig. 2, I may have each muddler or stick pierce a cherry or olive 35, which can be frozen with the water 13 and, if desired, as shown in Fig. 4, I can utilize tubular members 40, or a pair of tubular members, to serve as straws for drinking the contents of the glass in which they are subsequently placed for cooling and stirring. Where such hollow tubes or straws are utilized, the bottom portion of each tube 10 can be formed of rubber, as shown at 41, Fig. 4, to close the bottom of the tube and prevent the water 13 from flowing therein, when each tube is filled and, accordingly, the top portion of the cross-bar 28 would be similarly fitted, as shown at 44, Fig. 4, to fit the top of the tube and aid in the centering action.

If desired, the bottom of the tubes 10 may be pointed to permit an ordinary round stick 50 to have a projecting point 51 beyond the encircling ice 52, as shown at Fig. 7.

Various modifications can be readily utilized in the formation both of the muddler, the tubular container, and the covering members to center the same, as will readily occur to those skilled in the art.

I claim:

The improved method of preparing an ice-coated muddler formed with a pointed end, which consists in providing a tubular liquid-receiving member having a conical bottom to receive and to center the muddler point when fitted therein, applying a muddler lengthwise in said tube, filling with liquid, applying a holder over the liquid-receiving member to hold the muddler centered in said tube, subjecting the same to a freezing temperature to freeze ice in the tube about that portion of the muddler immersed therein, and thereafter releasing the muddler centering means and withdrawing the muddler with the ice-encircled about the same.

JOHN D'ARCEY.